(12) United States Patent
Suzuki

(10) Patent No.: US 8,964,224 B2
(45) Date of Patent: Feb. 24, 2015

(54) COMPUTER READABLE RECORDING MEDIUM STORING IMAGE PROCESSING PROGRAM AND IMAGE PROCESSING METHOD TRANSMITTING FUNCTION EXECUTION COMMAND FOR MAKING A PRESET SETTING SCREEN

(71) Applicant: Brother Kogyo Kabushiki Kaisha, Nagoya-shi, Aichi-ken (JP)

(72) Inventor: Hiroaki Suzuki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/843,083

(22) Filed: Mar. 15, 2013

(65) Prior Publication Data

US 2013/0265605 A1    Oct. 10, 2013

(30) Foreign Application Priority Data

Mar. 28, 2012   (JP) ................. 2012-074108

(51) Int. Cl.
*G06F 3/12* (2006.01)
*H04N 1/00* (2006.01)
(52) U.S. Cl.
CPC ....... *H04N 1/00384* (2013.01); *H04N 1/00225* (2013.01); *H04N 1/0023* (2013.01); *H04N 1/00482* (2013.01); *H04N 2201/0081* (2013.01)
USPC .......................................... 358/1.15; 358/1.1
(58) Field of Classification Search
CPC ................................. H04N 1/00384
USPC ................................ 358/1.15, 1.1
See application file for complete search history.

(56) References Cited

U.S. PATENT DOCUMENTS

| 7,148,978 B1 | 12/2006 | Mori | |
| 2002/0080376 A1* | 6/2002 | Momose et al. | ............... 358/1.9 |
| 2007/0002357 A1 | 1/2007 | Mori | |
| 2011/0043843 A1* | 2/2011 | Nishiyama | ................... 358/1.13 |
| 2011/0205577 A1 | 8/2011 | Mori et al. | |

FOREIGN PATENT DOCUMENTS

| JP | 2000-025311 A | 1/2000 |
| JP | 2002-182871 A | 6/2002 |
| JP | 2003-216376 A | 7/2003 |
| JP | 2004-240582 A | 8/2004 |
| JP | 2007-011701 A | 7/2007 |
| JP | 2010-154039 A | 7/2010 |
| JP | 2011-170182 A | 9/2011 |

* cited by examiner

*Primary Examiner* — Martin Mushambo
(74) *Attorney, Agent, or Firm* — Merchant & Gould PC

(57) ABSTRACT

An image processing method includes: displaying a functional image; storing processing information in association with the functional image; displaying a first setting screen and comprises an execution instruction image if an input made by a first operation for the functional image is received; transmitting, to the image forming apparatus, a function execution command if an input for the execution instruction image is received; displaying, on the display unit, a second setting screen if an input made by a second operation for the functional image is received; storing non-display information if a non-display instruction is received, and displaying, on the display unit, operation information if the non-display instruction is received.

13 Claims, 10 Drawing Sheets

COMPUTER READABLE RECORDING MEDIUM STORING IMAGE PROCESSING PROGRAM AND IMAGE PROCESSING METHOD TRANSMITTING FUNCTION EXECUTION COMMAND FOR MAKING A PRESET SETTING SCREEN

CROSS-REFERENCE TO RELATED APPLICATION

This application is based upon and claims the benefit of priority of Japanese Patent Application No. 2012-074108 filed on Mar. 28, 2012, the contents of which are incorporated herein by reference in its entirety.

BACKGROUND

The present disclosure relates to an image processing program and an image processing method for executing predetermined processing for image data.

In the related art, an image forming apparatus having a plurality of functions has been known. For example, in a related art, an image forming apparatus displays an icon for executing a predetermined function of a plurality of functions, based on a preset setting content. In such a related art, when a user manipulation to the icon is received, the preset setting content for the icon is displayed. Then, while the preset setting content is being displayed, a job is executed as the user holds an execution start key down.

Further, in another related art, when a user performs a short push operation on an icon in which a processing content using a predetermined function is set in advance, an image forming apparatus displays a setting screen indicating the processing content and executes processing based on the processing content as a start key is held down. When the user performs a long push operation, the image forming apparatus executes the processing based on the processing content without displaying the setting screen.

SUMMARY

In the related art, when a job is executed based on the setting content set for the icon, the setting content is displayed all the time. Therefore, whenever a job is executed, to display the setting content is troublesome for a user who knows the setting content already. Further, in said another related art, when the long push operation is performed on the icon, the processing can be executed without displaying the setting screen. However, a user who does not recognize the corresponding operation method cannot know the method of executing the processing unless the setting screen is displayed. Thus, the operability is deteriorated.

An aspect of the present disclosure has been made to solve the above problems. An object of the aspect of the present disclosure is to improve a user operability when the user instructs to execute processing by using a functional image such as icon for which a processing content is set in advance. The aspect of the present disclosure can be implemented in a variety of aspects such as an image processing apparatus, a control device controlling the image processing apparatus, an image processing system, an image processing method, a recording medium having the image processing program recorded therein, and the like.

The aspect of the present disclosure provides the following arrangements:

A non-transitory computer readable recording medium storing an image processing program that is executed by a computer of an image processing apparatus, the image processing program, when executed by the computer, causing the computer to function as:

a function display controller configured to display, on a display unit, a functional image for instructing to execute processing using a function of an image forming apparatus;

a storage controller configured to store, in a storage unit, processing information indicating a setting value for executing the function of the image forming apparatus in association with the functional image;

a first display controller configured to display, on the display unit, a first setting screen which variably displays the setting value stored in association with the functional image, the first setting screen including an execution instruction image for executing the function based on the setting value displayed on the screen, if an input made by a first operation for the functional image is received;

a transmission controller configured to transmit, to the image forming apparatus, a function execution command for executing the function based on the setting value displayed on the first setting screen if an input for the execution instruction image is received;

a second display controller configured to display, on the display unit, a second setting screen which variably displays the setting value stored in association with the functional image, if an input made by a second operation for the functional image is received;

a non-display storage controller configured to store, in the storage unit, non-display information indicating that the non-display instruction is received if a non-display instruction which does not display the first setting screen in response to the input made by the first operation at a state where the first setting screen is displayed on the display unit is received; and an operation display controller configured to display, on the display unit, operation information which indicates that the setting value can be changed by the input made by the second operation for the functional image if the non-display instruction is received, wherein the storage controller updates the setting value configuring the processing information into the setting value changed on the second setting screen if the setting value is changed on the second setting screen, wherein in a case that the input made by the first operation for the functional image is received, the first display controller does not display the first setting screen on the display unit if the non-display information is stored in the storage unit, and wherein the transmission unit transmits, to the image forming apparatus, the function execution command which executes the function based on the processing information stored in the storage unit in association with the functional image if the input made by the first operation for the functional image is received at a state where the non-display information is stored in the storage unit.

An image processing method capable of performing communication with an image forming apparatus capable of executing predetermined processing for image data, the method comprising:

displaying a functional image for executing processing using a function of the image forming apparatus on a display unit;

storing, in a storage unit, processing information indicating a setting value for executing a function of the image forming apparatus in association with the functional image;

displaying, on the display unit, a first setting screen which variably displays the setting value stored in association with the functional image and includes an execution instruction image for executing the function based on the setting value displayed on the screen if an input made by a first operation for the functional image is received;

transmitting, to the image forming apparatus, a function execution command for executing the function based on the setting value displayed on the first setting screen if an input for the execution instruction image is received;

displaying, on the display unit, a second setting screen which variably displays the setting value stored in association with the functional image if an input made by a second operation for the functional image is received;

storing non-display information indicating that the non-display instruction is received in the storage unit if a non-display instruction which does not display the first setting screen in response to the input made by the first operation at a state where the first setting screen is displayed on the display unit is received, and displaying, on the display unit, operation information which indicates that the setting value can be changed by the input made by the second operation for the functional image if the non-display instruction is received, wherein if the setting value is changed on the second setting screen, the setting value configuring the processing information is updated into a changed setting value, wherein in a case that the input made by the first operation for the functional image is received, the first setting screen is not displayed on the display unit if the non-display information is stored in the storage unit, and wherein if the input made by the first operation for the functional image is received at a state where the non-display information is stored in the storage unit, the function execution command, which executes the function based on the processing information stored in the storage unit in association with the functional image, is transmitted to the image forming apparatus.

An information processing apparatus comprising:
a processor; and
memory storing computer readable instructions that, when executed by the processor, causing the apparatus to function as:
  a function display controller configured to display, on a display unit, a functional image for instructing to execute processing using a function of an image forming apparatus;
  a storage controller configured to store, in a storage unit, processing information indicating a setting value for executing the function of the image forming apparatus in association with the functional image;
  a first display controller configured to display, on the display unit, a first setting screen which variably displays the setting value stored in association with the functional image, the first setting screen including an execution instruction image for executing the function based on the setting value displayed on the screen, if an input made by a first operation for the functional image is received;
  a transmission controller configured to transmit, to the image forming apparatus, a function execution command for executing the function based on the setting value displayed on the first setting screen if an input for the execution instruction image is received;
  a second display controller configured to display, on the display unit, a second setting screen which variably displays the setting value stored in association with the functional image, if an input made by a second operation for the functional image is received;
  a non-display storage controller configured to store, in the storage unit, non-display information indicating that the non-display instruction is received if a non-display instruction which does not display the first setting screen in response to the input made by the first operation at a state where the first setting screen is displayed on the display unit is received; and
  an operation display controller configured to display, on the display unit, operation information which indicates that the setting value can be changed by the input made by the second operation for the functional image if the non-display instruction is received, wherein the storage controller updates the setting value configuring the processing information into the setting value changed on the second setting screen if the setting value is changed on the second setting screen, wherein in a case that the input made by the first operation for the functional image is received, the first display controller does not display the first setting screen on the display unit if the non-display information is stored in the storage unit, and wherein the transmission unit transmits, to the image forming apparatus, the function execution command which executes the function based on the processing information stored in the storage unit in association with the functional image if the input made by the first operation for the functional image is received at a state where the non-display information is stored in the storage unit.

According to the aspect of the present disclosure, when the input for the functional image is received, the first setting screen is not displayed on the display unit if the non-display information is stored. When the input for the functional image is received at a state where the non-display information is stored, the execution command based on the processing information stored in association with the functional image is transmitted to the image forming apparatus. That is, by the input for the functional image, it is possible to transmit the execution command to the image forming apparatus without displaying the first setting screen. Thereby, it is possible to simplify the operation sequence.

When a non-display instruction for storing the non-display information is received, operation information, which indicates that the setting value can be changed by the input made by a specific operation for the functional image, is displayed on the display unit. That is, when an instruction for prohibiting the display of the first setting screen is made, a sequence for changing a setting content is displayed on the display unit. Thereby, a user can know the sequence for changing the setting content when the display of the first setting screen is prohibited.

Therefore, according to the image processing program of the aspect of the present disclosure, it is possible to improve the user operability.

DESCRIPTION OF EXEMPLARY EMBODIMENTS

<First Embodiment>

Figure 1:
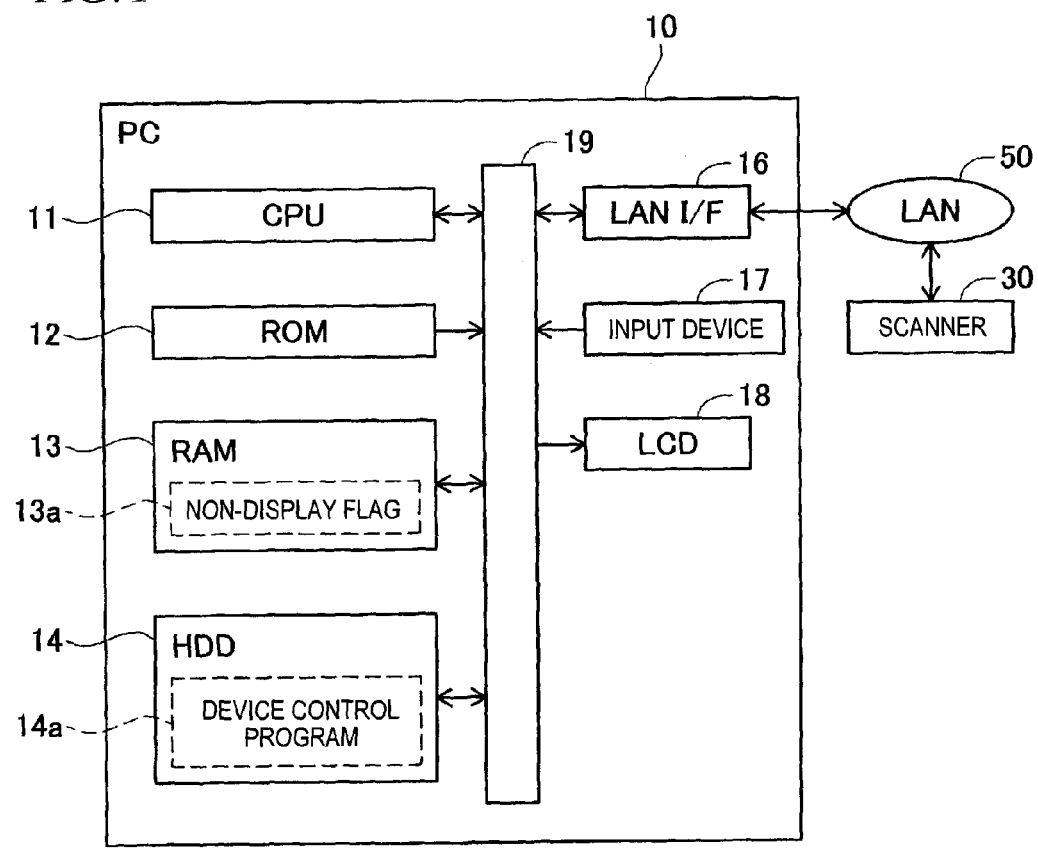
FIG. 1 is a block diagram of a PC 10.

Hereinafter, exemplary embodiments of the present disclosure will be described with reference to the accompanying drawings. FIG. 1 is a block diagram showing an electrical configuration of a personal computer (PC) 10 in which a device control program (hereinafter, referred to as 'the present program') 14a according to a first embodiment is mounted. The PC 10 is connected to a scanner 30 via a LAN 50.

The PC 10 mainly has a CPU 11, a ROM 12, a RAM 13, a hard disk drive (HDD) 14, a LAN interface (LAN I/F) 16, an input device 17 and an LCD 18, which are connected each other via a bus line 19.

The CPU 11 controls respective units connected by the bus line 19, in response to fixed values or programs stored in the ROM 12 or HDD 14. The ROM 12 is a memory in which a program for controlling an operation of the PC 10 and the like are stored. The RAM 13 is readable/writable volatile memory that temporarily stores therein data necessary for processing of the CPU 11 and the like and is provided therein with a non-display flag 13a. The non-display flag 13a is a flag indicating whether or not to display a setting change dialogue A (refer to (b) of FIG. 2) (which will be described later) on the LCD 18.

The HDD 14 is a rewritable non-volatile storage device and permanently stores therein the data necessary for processing of the CPU 11 and the like. The HDD 14 stores the present program 14a. The present program 14a is a program for controlling an operation of the scanner 30 from the PC 10. The processing shown in FIGS. 5 and 6 (which will be described later) is executed by the CPU 11, in response to the present program 14a.

The LAN I/F 16 is an interface for performing communication with the other device connected to the LAN 50. The input device 17 has a keyboard and a mouse for inputting an instruction or information to the PC 10.

Figure 2:
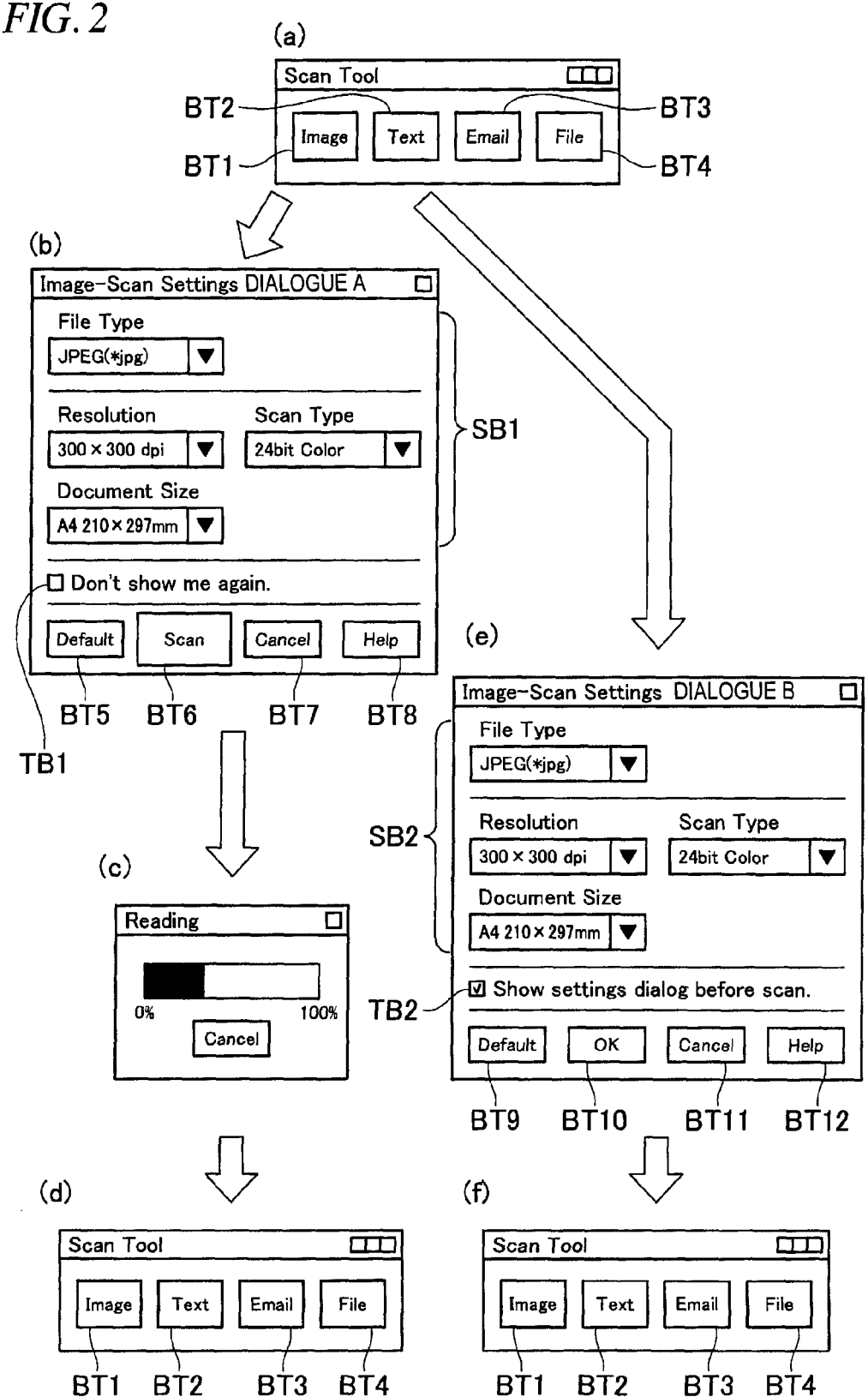
FIG. 2 shows a display mode of an LCD 18 at a state where non-display information is deleted.
Figure 3:
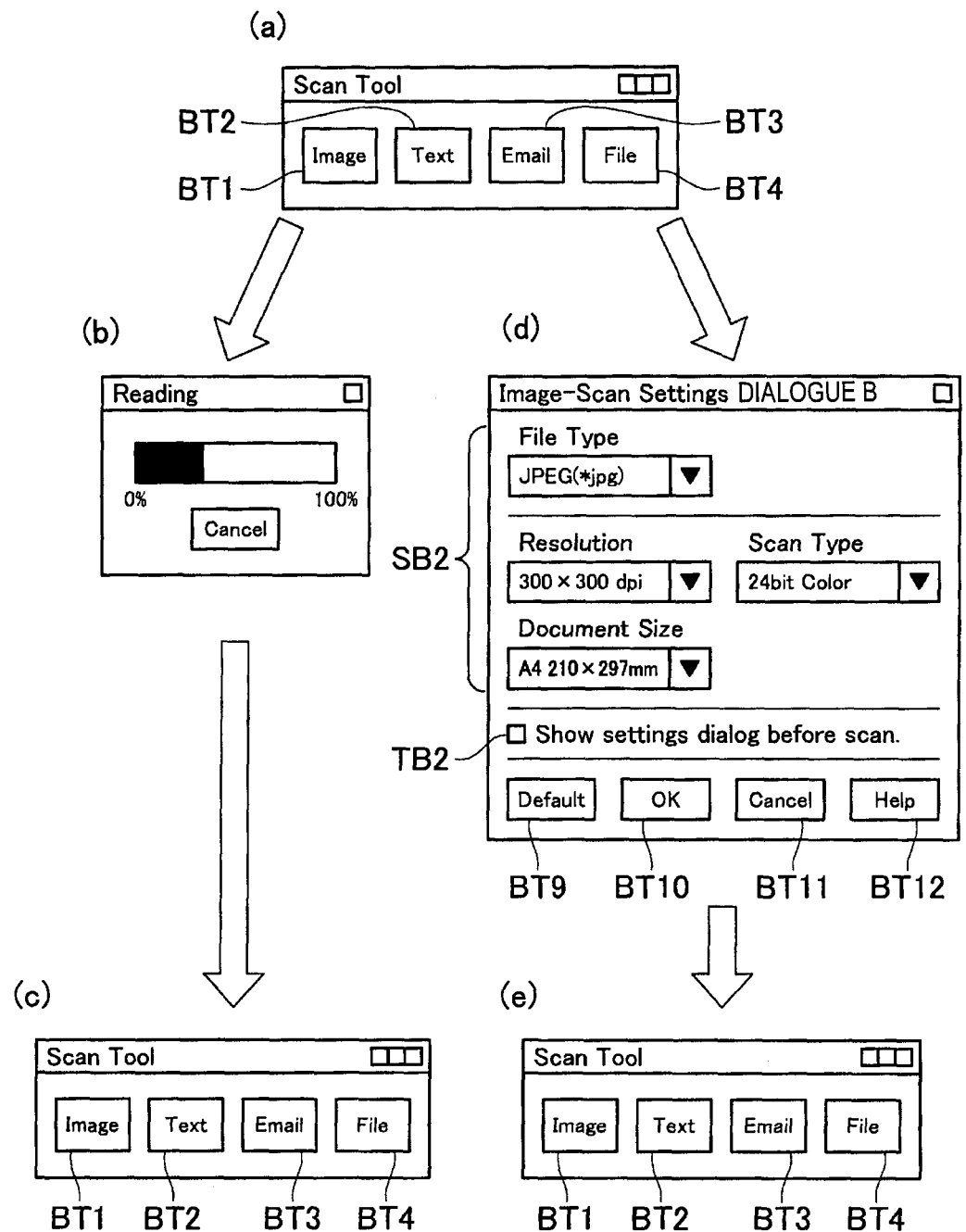
FIG. 3 shows a display mode of the LCD 18 at a state where the non-display information is stored.

In the below, a variety of display images that are displayed on the LCD 18 when image reading processing is executed are described with reference to FIGS. 2 to 4. When the present program 14a starts up in the PC 10, a scanner control window shown in (a) of FIG. 2 is displayed on the LCD 18.

In the scanner control window, buttons BT1 to BT4 to which a variety of image reading processing is individually allotted are displayed. The respective buttons BT1 to BT4 are allotted with processing that instructs the scanner 30 to read image data of a document image and corresponds to the respective buttons BT1 to BT4. The reading of the document image and the processing corresponding to the respective buttons BT1 to BT4 are performed as a user operates the mouse serving as the input device 17.

Specifically, a user operates the mouse to thus move a cursor (not shown) onto the button BT1 to BT4 (hereinafter, referred to as 'desired button') to which desired processing is allotted, thereby indicating the desired button BT1 to BT4 with the cursor. At a state where the desired button BT1 to BT4 is indicated with the cursor, the user holds a left button of the mouse down (left-clicks the button). Thereby, a setting change dialogue A is displayed on the LCD 18, instead of the scanner control window.

In the setting change dialogue A, processing information corresponding to the respective processing is displayed. The processing information is configured by setting values for setting items corresponding to the respective processing and is set for each processing corresponding to the button BT1 to BT4. Specifically, for example, when the user left-clicks the button with the button BT1 being indicated with the cursor, the setting change dialogue A shown in (b) of FIG. 2 is displayed on the LCD 18.

As shown in (b) of FIG. 2, a selection box SB1 group, a Default button BT5, a Scan button BT6, a Cancel button BT7 and a Help button BT8 are displayed in the setting change dialogue A. The selection box SB 1 is provided for each setting item and one selection box SB1 displays a setting value for one selection item. In the selection box SB 1, the setting values that are stored in the HDD 14 in correspondence to the selected button BT1 to BT4 are displayed at first.

When changing the setting value displayed in the selection box SB1, the user left-clicks the button with one selection box being indicated with the cursor to thus display a list of selection options for the setting value and selects one setting value from the list to thus change the setting value.

Then, when the user left-clicks the button at a state where the cursor indicates the Scan button BT6, a document image is read and the processing corresponding to the selected button BT1 to BT4 is executed. At this time, the processing is executed based on the processing information displayed in the setting change dialogue A.

While the processing is being executed, a reading window shown in (c) of FIG. 2 is displayed instead of the setting change dialogue A. The reading window indicates the reading of the document image and a progressing status of the processing corresponding to the selected button BT1 to BT4. When the processing is over, the scanner control window is displayed, as shown in (d) of FIG. 2, instead of the reading window.

By the above series of operations, the various image reading processing is executed. It is possible to change the processing information corresponding to the respective processing without executing the image reading processing. Specifically, the user operates the mouse to thus move the cursor onto the button BT1 to BT4 for which it is intended to change the processing information, thereby indicating the desired button BT1 to BT4 with the cursor. At a state where the desired button BT1 to BT4 is indicated with the cursor, the user holds a right button of the mouse down (right-clicks the button). Thereby, a setting change dialogue B is displayed on the LCD 18, instead of the scanner control window.

The setting change dialogue B is also set for each processing corresponding to the button BT1 to BT4, like the setting change dialogue A. For example, when the user right-clicks the button with the button BT1 being indicated with the cursor, the setting change dialogue B shown in (e) of FIG. 2 is displayed on the LCD 18.

As shown in (e) of FIG. 2, a selection box SB2 group, a Default button BT9, an OK button BT10, a Cancel button BT11 and a Help button BT12 are displayed in the setting change dialogue B. The selection box SB2 group is configured so that the setting values of the setting items can be changed, like the selection box SB1 group to be displayed in the setting change dialogue A.

Then, when the user left-clicks the button at a state where the cursor indicates the OK button BT10, setting values of setting items corresponding to the processing of the selected button BT1 to BT4 are updated. That is, the setting values that are stored in the HDD 14 are updated to the setting values displayed in the setting change dialogue B, in accordance with the processing of the selected BT1 to BT4. Then, the scanner control window is displayed, as shown in (f) of FIG. 2, instead of the setting change dialogue B.

It is possible to execute the various image reading processing without displaying the setting change dialogue A. Specifically, as shown in (b) of FIG. 2, a non-display check box TB1 is displayed in the setting change dialogue A. The non-display check box TB1 is to prohibit the display of the setting change dialogue A. When the user performs a non-display instruction in the non-display check box TB1, the display of the setting change dialogue A is prohibited.

The non-display instruction is made as the user indicates the non-display check box TB1 having a blank with the cursor and then left-clicks the non-display check box. The non-display check box TB1 in which the non-display instruction has been made is denoted with a symbol '✓'. Hereinafter, the symbol is referred to as a non-display check. In the meantime, the non-display check box TB1 is not denoted with the non-display check at first.

When the non-display instruction is made in the non-display check box TB1, a non-display flag 13a that is provided in the RAM 13 becomes ON. At a state where the non-display flag 13a is ON, when the user indicates the desired button BT1 to BT4 with the cursor and left-clicks the button, the reading window is displayed while the setting change dialogue A is not displayed, as shown in (a) and (b) of FIG. 3. That is, when the desired button BT1 to BT4 is selected by the left-click operation, the image reading processing corresponding to the selected button is executed while the setting change dialogue A is not displayed.

Thereby, it is possible to prohibit the setting change dialogue A from being displayed, depending on the user's intention, thereby simplifying the operability. As a result, the operability for performing the image reading processing is improved.

Figure 4:
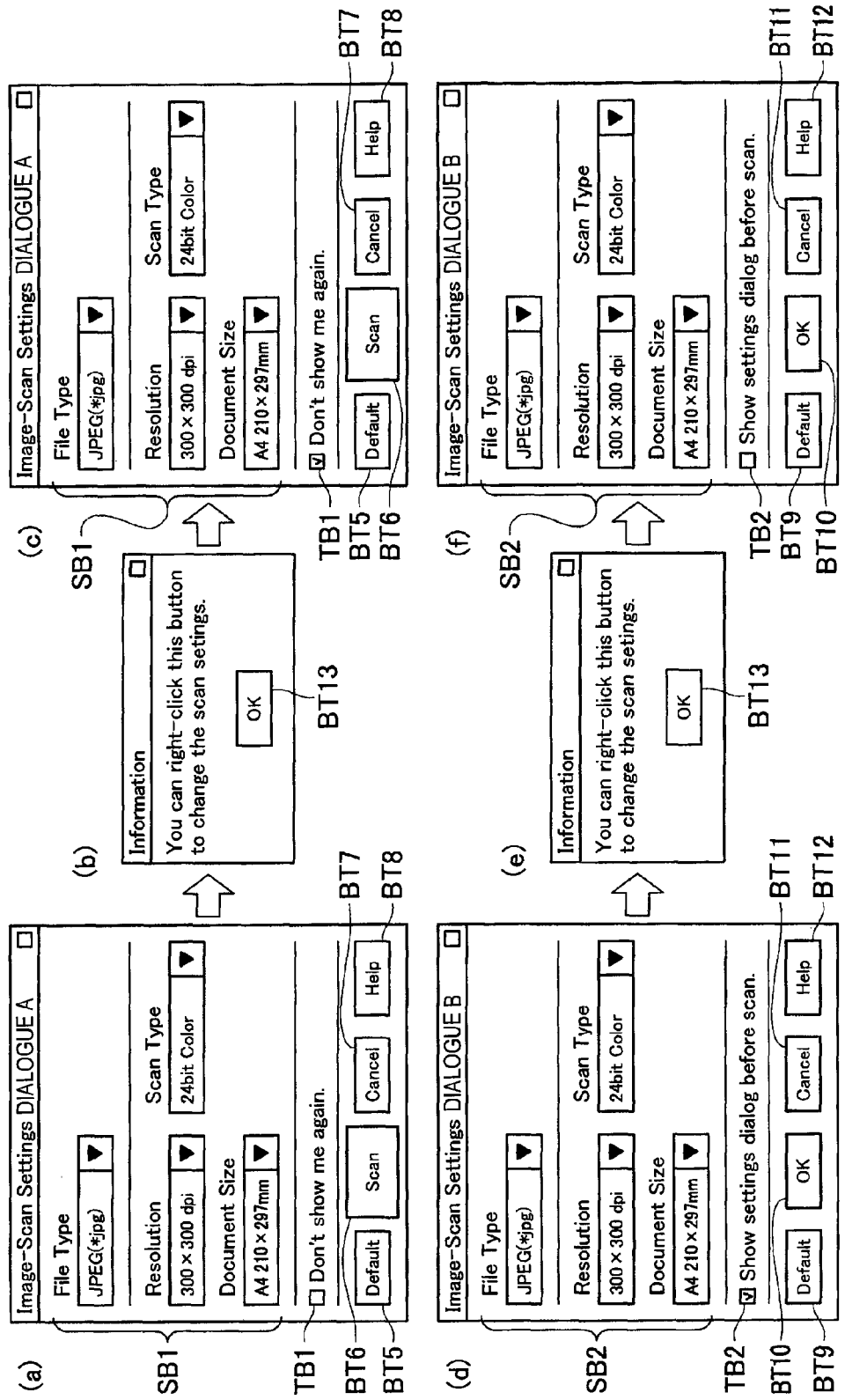
FIG. 4 shows a display mode of the LCD 18 when a non-display instruction is received.

When the non-display instruction is made in the non-display check box TB1, an information window is displayed on the LCD 18, as shown in (b) of FIG. 4. The information window is to explain a sequence for displaying the setting change dialogue B on the LCD 18. In the information window, a message "You can right-click the OK button BT13 and the button BT1 to BT4 to change the setting values" is displayed.

Thereby, it is possible to inform the user of the sequence for changing the setting values of the setting items at a state where the setting change dialogue A is prohibited from being displayed, thereby improving the convenience. When the OK button BT13 is left-clicked in the information window, the setting change dialogue A in which the non-display check is marked in the non-display check box TB1 is displayed, as shown in (c) of FIG. 4.

It is possible to release the prohibition of the display of the setting change dialogue A. Specifically, a display check box TB2 is marked in the setting change dialogue B, which is displayed as the button BT1 to BT4 is right-clicked, as shown in (d) of FIG. 3. The display check box TB2 is to release the prohibition of the display of the setting change dialogue A. When the user makes a display instruction in the display check box TB2, the prohibition of the display of the setting change dialogue A is released.

The display instruction is made as the user indicates the display check box TB2 having a blank with the cursor and then left-clicks the display check box. The display check box TB2 in which the display instruction has been made is denoted with a symbol '✓'. Hereinafter, the symbol is referred to as a display check.

When the display instruction is made in the display check box TB2, the non-display flag 13a that is provided in the RAM 13 becomes OFF. At a state where the non-display flag 13a is OFF, when the user indicates the desired button BT1 to BT4 with the cursor and left-clicks the same, the setting change dialogue A is displayed, as shown in (a) and (b) of FIG. 2.

Thereby, after the setting change dialogue A is prohibited from being displayed, it is possible to release the prohibition depending on the user's intention, thereby improving the convenience. In the meantime, at a state where the display check is marked in the display check box TB2, the non-display check is removed from the non-display check box TB1 of the setting change dialogue A, as shown in (b) of FIG. 2. On the other hand, at a state where the non-display check is marked in the non-display check box TB1, the display check is removed from the display check box TB2 of the setting change dialogue B, as shown in (d) of FIG. 3.

The user may indicate the display check box TB2, in which the display check is marked, with the cursor and left-click the same, thereby removing the display check from the display check box TB2. That is, the display instruction in the display check box TB2 is released. Thereby, the setting change dialogue A is again prohibited from being displayed.

When the display instruction is released in the display check box TB2, the non-display flag 13a that is provided in the RAM 13 becomes ON. Thereby, when the user indicates the desired button BT1 to BT4 with the cursor and left-clicks the same, the image reading processing is performed while the setting change dialogue A is not displayed.

When the display instruction is released in the display check box TB2, an information window is displayed on the LCD 18, as shown in (e) of FIG. 4. The information window is the same as the information window, which is displayed as the non-display instruction is made in the non-display check box TB1, and explains a sequence for displaying the setting change dialogue B on the LCD 18.

Like this, even when the setting change dialogue A is prohibited from being displayed in the setting change dialogue B, it is possible to inform the user of the sequence for changing the setting values of the setting items, thereby improving the convenience. When the OK button BT13 is left-clicked in the information window, the setting change dialogue B in which the display check has been removed from the display check box TB2 is displayed, as shown in (f) of FIG. 4. At the state where the display check has been removed from the display check box TB2, the non-display check is marked in the non-display check box TB1 of the setting change dialogue A.

The non-display flag for prohibiting the setting change dialogue A from being displayed and releasing the prohibition is common to the buttons BT1 to BT4. That is, a flag value that is set in a button operation of one of the buttons BT1 to BT4 is also used in the other button operation of the buttons BT1 to BT4. Therefore, the flag value that is set in the most recent button operation of one of the buttons BT1 to BT4 is stored as the non-display flag 13a.

Specifically, for example, when the user performs a button operation for the button BT2 after making the non-display instruction in the non-display check box TB1 at the time of a button operation for the button BT1, the state where the setting change dialogue A is prohibited from being displayed is kept. Thereby, it is not necessary to perform an operation for prohibiting the setting change dialogue A from being displayed for each of the buttons BT1 to BT4, so that the operability is improved.

The setting change dialogue A and the setting change dialogue B are substantially the same, except for the non-display check box TB1, the display check box TB2, the Scan button BT6 and the OK button BT10, as shown in (b) and (e) of FIG. 2. The non-display check box TB1 and the display check box TB2 are displayed in the same area although the comment contents thereof are different.

The same area means a divided same place when the setting change dialogue A and the setting change dialogue B are divided in the same ratio. Thereby, even when any of the setting change dialogue A and the setting change dialogue B is displayed on the LCD 18, the user can change the setting values of the setting items and the like without feeling a sense of discomfort.

The Scan button BT6 and the OK button BT10 are also displayed in the same area. Thereby, even when any of the setting change dialogue A and the setting change dialogue B is displayed on the LCD 18, the user can perform the button operation without feeling a sense of discomfort. However, the Scan button BT6 is larger than the OK button BT10, i.e., emphatically displayed. Thereby, the user can distinguish between the setting change dialogue A and the setting change dialogue B that are much similar.

The PC 10 transmits an execution command for executing the image reading processing to the scanner 30 by using the present program 14a. A flow of the present program 14a is specifically described with reference to FIGS. 5 and 6. The flow of FIG. 5 starts when a startup instruction for the present program 14a is received.

In S100, the CPU 11 starts up an application screen and displays the scanner control window (refer to (a) of FIG. 2) on the LCD 18. Then, the CPU 11 proceeds to S101. In S101, the CPU 11 determines whether the cursor is in the button area. When the cursor is in the button area (S101: YES), the CPU 11 proceeds to S104. In S104, the CPU 11 determines whether the left-click is made or not. When the left-click is made (S104: YES), the CPU 11 proceeds to S106. In S106, the CPU 11 acquires the setting values of the setting items that are stored in the HDD 14. Then, the CPU 11 proceeds to S108.

In S108, the CPU 11 acquires the non-display flag that is common to all the buttons BT1 to BT4. Then, the CPU 11 proceeds to S110. In S110, the CPU 11 determines whether the non-display check is marked in the non-display check boxes TB1 of all the buttons BT1 to BT4. That is, the CPU 11 determines whether the common non-display flag is ON. When the non-display check is marked (S110: YES), the CPU 11 proceeds to S112.

Figure 6:
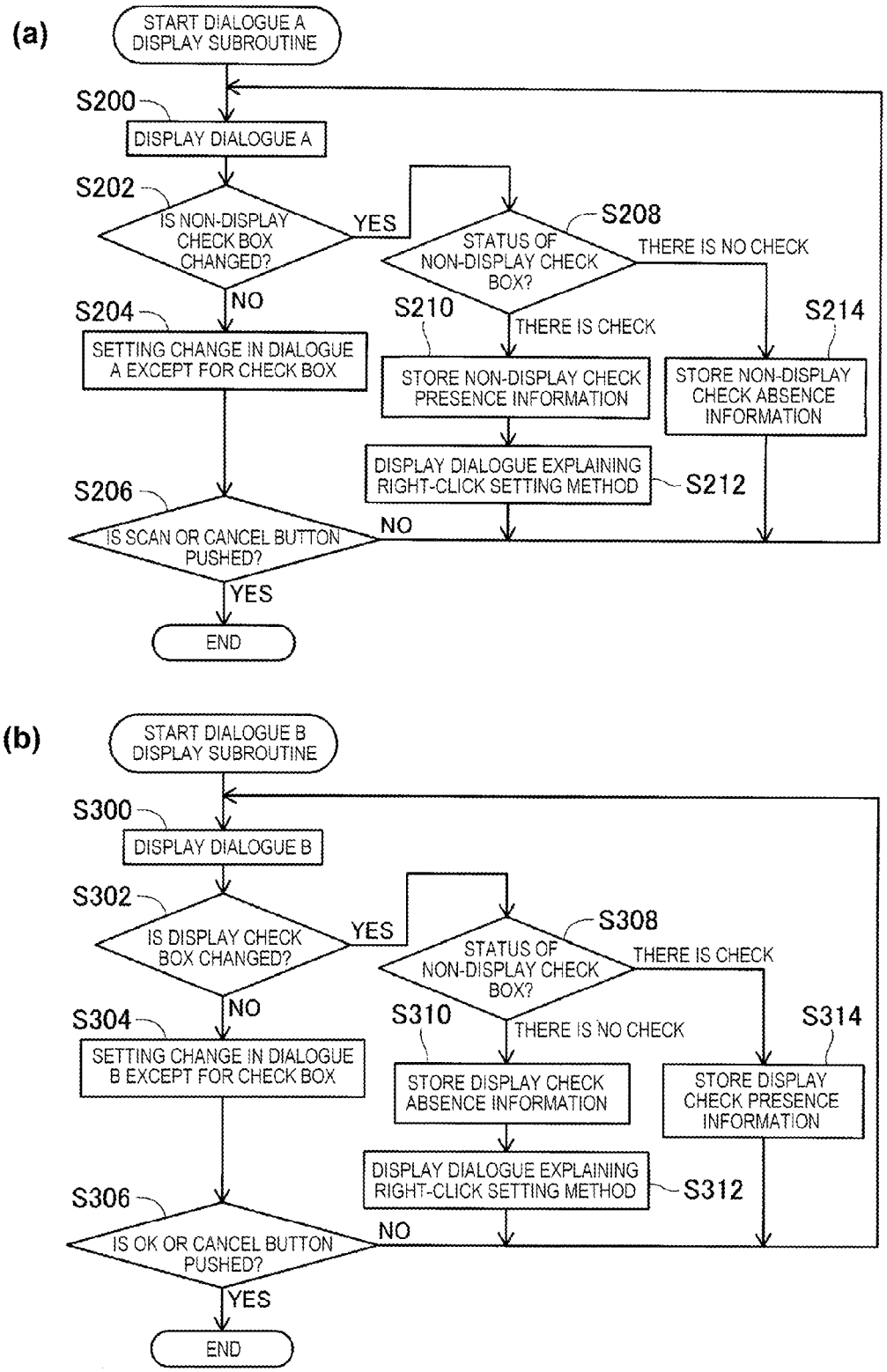
FIG. 6 shows a subroutine of the operation flowchart shown in FIG. 5.

On the other hand, when the non-display check is not marked (S110: NO), the CPU 11 proceeds to S114. In S114, a dialogue A display subroutine shown in (a) of FIG. 6 is executed. In S200, the CPU 11 displays the setting change dialogue A (refer to (a) of FIG. 2) on the LCD 18. Then, the CPU 11 proceeds to S202. In S202, the CPU 11 determines whether the non-display check box TB1 is changed. When the non-display check box TB1 is not changed (S202: NO), the CPU 11 proceeds to S204.

In S204, the CPU 11 stores the setting change in the setting change dialogue A, except for the non-display check box TB1, in the RAM 13. Then, the CPU 11 proceeds to S206. In S206, the CPU 11 determines whether the Scan button BT6 or Cancel button BT7 is left-clicked. When the Scan button BT6 or Cancel button BT7 is left-clicked (S206: YES), the CPU 11 returns to the main routine shown in FIG. 5. On the other hand, when the Scan button BT6 or Cancel button BT7 is not left-clicked (S206: NO), the CPU 11 returns to S200.

On the other hand, when it is determined in S202 that the non-display check box TB1 is changed (S202: YES), the CPU 11 proceeds to S208. In S208, the CPU 11 checks a status of the non-display check box TB1. That is, the CPU 11 checks whether the non-display check is marked in the non-display check box TB1. When the non-display check is marked (S208: there is the check), the CPU 11 proceeds to S210. In S210, the CPU 11 stores non-display check presence information, which indicates that there is the non-display check, in the RAM 13. Then, the CPU 11 proceeds to S212. In S212, the CPU 11 displays the information window (refer to (b) of FIG. 4) on the LCD 18. Then, the CPU 11 returns to S200.

On the other hand, when it is determined in S208 that the non-display check is not marked (S208: there is no check), the CPU 11 proceeds to S214. In S214, the CPU 11 stores non-display check absence information, which indicates that there is no non-display check, in the RAM 13. Then, the CPU 11 returns to S200.

Figure 5:
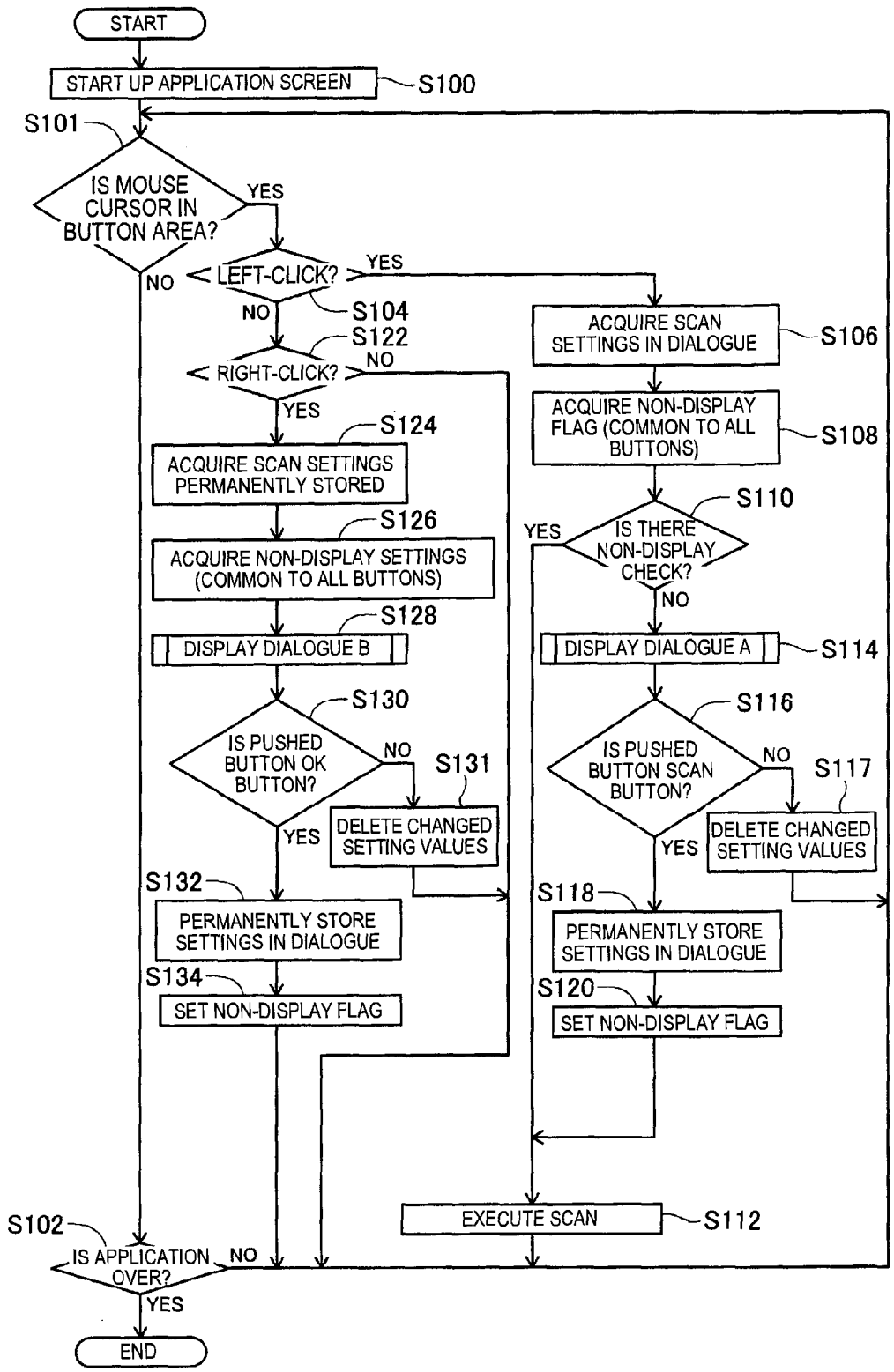
FIG. 5 shows an operation flowchart of the PC 10 according to a first embodiment.

When the dialogue A display subroutine is over, the CPU 11 determines in S116 of the main routine shown in FIG. 5 whether the button, for which it is determined in S206 that the left-click is made, is the Scan button BT6. When the Cancel button BT7 is left-clicked (S116: NO), the CPU 11 proceeds to S117. In S117, the CPU 11 deletes the setting values stored in the RAM 13 in S204, the non-display check presence information stored in the RAM 13 in S210 and the non-display check absence information stored in the RAM 13 in S214 and returns to S101. On the other hand, when the non-display check presence information or non-display check absence information is not stored in the RAM 13, as the case where the setting change is not made in S204, the CPU 11 skips over S117 and returns to S101.

On the other hand, when the Scan button BT6 is left-clicked (S116: YES), the CPU 11 proceeds to S118. In S118, the CPU 11 stores the setting change in the setting change dialogue A, which has been stored in the RAM 13 in S204, in the HDD 14 and deletes the setting change stored in the RAM 13. Then, the CPU 11 proceeds to S120. In S120, the CPU 11 sets the non-display flag 13a, based on the non-display check presence information or non-display check absence information stored in the RAM 13. Specifically, when the non-display check presence information is stored in the RAM 13, the CPU 11 sets the non-display flag 13a ON, and when the non-display check absence information is stored in the RAM 13, the CPU 11 sets the non-display flag 13a OFF. Then, the CPU 11 deletes the non-display check presence information or non-display check absence information from the RAM 13 and proceeds to S112. In S112, the CPU 11 transmits an execution command for executing processing corresponding to the operated button BT1 to BT4 to the scanner 30. Then, the CPU 11 returns to S101.

On the other hand, when it is determined in S104 that the left-click is not made (S104: NO), the CPU 11 proceeds to S122. In S122, the CPU 11 determines whether the right-click is made or not. When the right-click is not made (S122: NO), the CPU 11 returns to S101.

On the other hand, when the right-click is made (S122: YES), the CPU 11 proceeds to S124. In S124, the CPU 11 acquires the setting values of the setting items stored in the HDD 14. Then, the CPU 11 proceeds to S126. In S126, the CPU 11 acquires the non-display flag that is common to all the buttons BT1 to BT4. Then, the CPU 11 proceeds to S128.

In S128, a dialogue B display subroutine shown in (b) of FIG. 6 is executed. In S300, the CPU 11 displays the setting change dialogue B (refer to (e) of FIG. 2) on the LCD 18.

Then, the CPU 11 proceeds to S302. In S302, the CPU 11 determines whether the display check box TB2 has been changed. When the display check box TB2 has not been changed (S302: NO), the CPU 11 proceeds to S304.

In S304, the CPU 11 stores the setting change in the setting change dialogue B, except for the display check box TB2, in the RAM 13. Then, the CPU 11 proceeds to S306. In S306, the CPU 11 determines whether the OK button BT10 or Cancel button BT11 is left-clicked. When the OK button BT10 or Cancel button BT11 is left-clicked (S306: YES), the CPU 11 returns to the main routine shown in FIG. 5. On the other hand, when the OK button BT10 or Cancel button BT11 is not left-clicked (S306: NO), the CPU 11 returns to S300.

On the other hand, when it is determined in S302 that the display check box TB2 has been changed (S302: YES), the CPU 11 proceeds to S308. In S308, the CPU 11 checks a status of the display check box TB2. That is, the CPU 11 checks whether the display check is marked in the display check box TB2. When the display check is not marked (S208: there is no check), the CPU 11 proceeds to S310. In S310, the CPU 11 stores display check absence information, which indicates that there is no display check, in the RAM 13. Then, the CPU 11 proceeds to S312. In S312, the CPU 11 displays the information window (refer to (e) of FIG. 4) on the LCD 18. Then, the CPU 11 returns to S300.

On the other hand, when it is determined in S308 that the display check is marked (S209: there is the check), the CPU 11 proceeds to S314. In S314, the CPU 11 stores display check presence information, which indicates that there is the display check, in the RAM 13. Then, the CPU 11 returns to S300.

When the dialogue B display subroutine is over, the CPU 11 determines in S130 of the main routine shown in FIG. 5 whether the button, for which it is determined in S306 that the left-click is made, is the OK button BT10. When the Cancel button BT11 is left-clicked (S116: NO), the CPU 11 proceeds to S131. In S131, the CPU 11 deletes the setting values stored in the RAM 13 in S304, the display check absence information stored in the RAM 13 in S310 and the display check presence information stored in the RAM 13 in S314 and returns to S101. On the other hand, when the display check absence information or display check presence information is not stored in the RAM 13, as the case where the setting change is not made in S304, the CPU 11 skips over S131 and returns to S101.

On the other hand, when the OK button BT10 is left-clicked (S130: YES), the CPU 11 proceeds to S132. In S132, the CPU 11 stores the setting change in the setting change dialogue B, which has been stored in the RAM 13 in S304, in the HDD 14 and deletes the setting change stored in the RAM 13. Then, the CPU 11 proceeds to S134. In S134, the CPU 11 sets the non-display flag 13a, based on the display check absence information or display check presence information stored in the RAM 13. Specifically, when the display check absence information is stored in the RAM 13, the CPU 11 sets the non-display flag 13a ON, and when the display check presence information is stored in the RAM 13, the CPU 11 sets the non-display flag 13a OFF. Then, the CPU 11 deletes the display check absence information or the display check presence information from the RAM 13 and returns to S101.

On the other hand, when it is determined in S101 that the cursor is not in the button area (S101: NO), the CPU 11 proceeds to S102. In S102, the CPU 11 determines whether the application is not over. When the application is not over (S102: NO), the CPU 11 returns to S101. On the other hand, when the application is over (S102: YES), the CPU 11 ends the flow.

In the below, operations of the PC 10 in accordance with second to fifth embodiments are described with reference to flows shown in FIGS. 7 to 10. Since the configurations of the PC 10 and the scanner 30 in the second to fifth embodiments are the same as those of the PC 10 and the scanner 30 in the first embodiment, the descriptions thereof are omitted. In the processing of the flows shown in FIGS. 7 to 10, the non-display flag is set for each of the buttons BT1 to BT4. Therefore, in the PC 10 of the second to fifth embodiments, since it is not necessary to acquire the non-display flag that is common to all the buttons BT1 to BT4, the processing corresponding to S108 and S126 shown in FIG. 5 is not executed.

<Second Embodiment>

Figure 7:
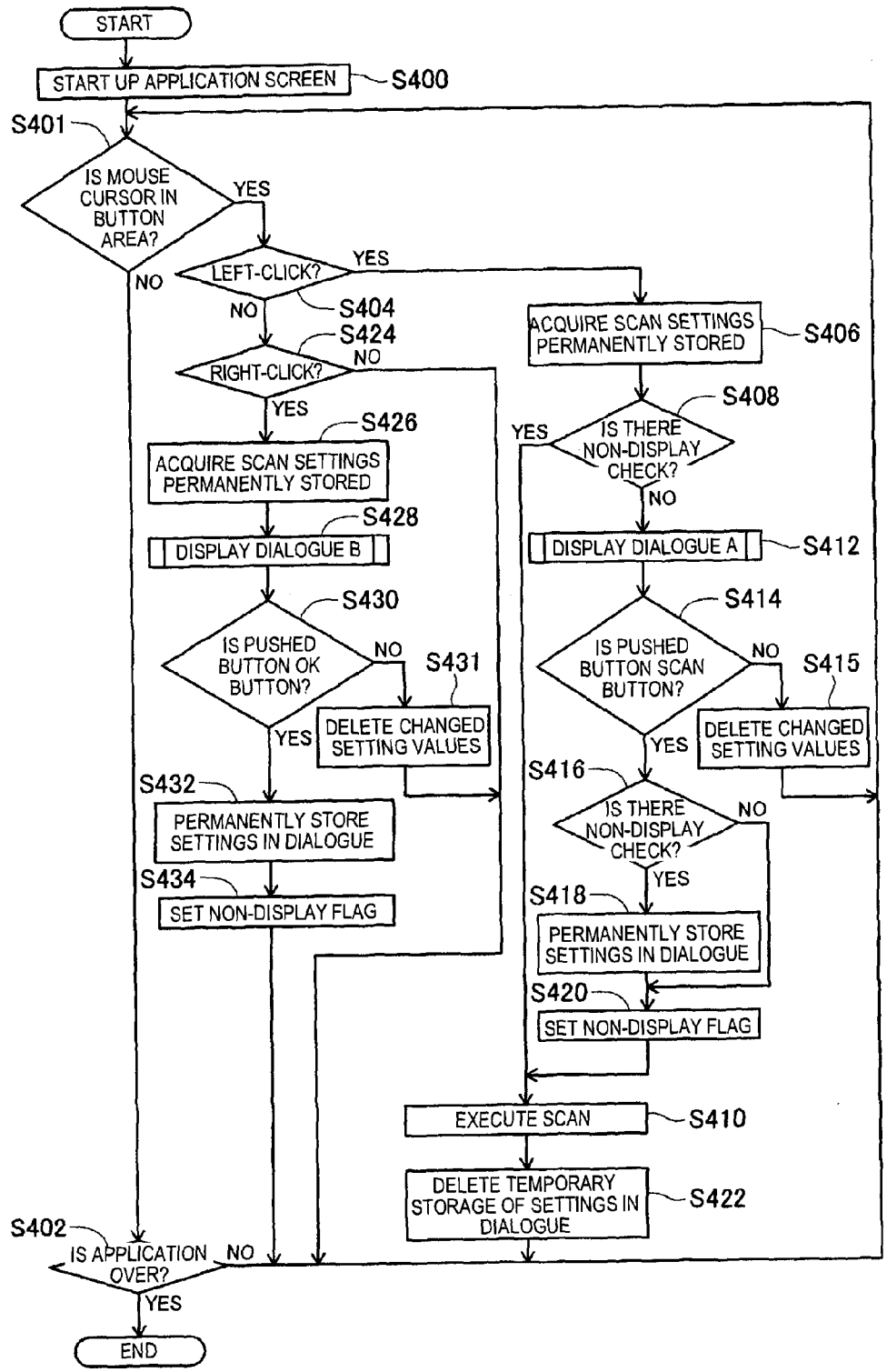
FIG. 7 shows an operation flowchart of the PC 10 according to a second embodiment.

The PC 10 according to the second embodiment transmits an execution command for executing the image reading processing in accordance with the flow shown in FIG. 7 to the scanner 30. Since the processing of the flow shown in FIG. 7 is substantially the same as that of the flow shown in FIG. 5, except for S416 to S422, the processing of S416 to S422 is described.

In S416, the CPU 11 determines whether the non-display check is marked in the non-display check box TB1 of the setting change dialogue A. That is, the CPU 11 determines whether the non-display check presence information is stored in the RAM 13. When the non-display check is marked (S416: YES), the CPU 11 proceeds to S418. In S418, the CPU 11 stores the setting change in the setting change dialogue A, which has been stored in the RAM 13 in S204, in the HDD 14. Then, the CPU 11 proceeds to S420. In S420, the CPU 11 sets the non-display flag 13a, based on the non-display check presence information or non-display check absence information stored in the RAM 13. Then, the CPU 11 deletes the non-display check presence information or non-display check absence information from the RAM 13 and proceeds to S410.

In S410, the CPU 11 transmits an execution command for executing the processing based on the setting values of the setting items stored in the RAM 13 in S204 to the scanner 30. Then, the CPU 11 proceeds to S422. In S422, the CPU 11 deletes the content of the setting change in the setting change dialogue A stored in the RAM 13. Then, the CPU 11 returns to S401.

As the flow is executed, the setting change in the setting change dialogue A is stored in the HDD 14 when the setting change dialogue A is prohibited from being displayed. That is, when the setting change dialogue A is prohibited from being displayed, the setting change in the setting change dialogue A is permanently stored until a setting change is made next time. Thereby, it is possible to continuously use the changed setting change at a situation where it is difficult to change the setting items, so that the convenience is improved.

On the other hand, when the setting change dialogue A is not prohibited from being displayed, the setting change in the setting change dialogue A is stored in the RAM 13 and is deleted after the execution command is transmitted. That is, when the setting change dialogue A is not prohibited from being displayed, the setting change in the setting change dialogue A is just temporarily stored. Thereby, it is possible to change the setting items from the initial setting status at a situation where it is easy to change the setting items, so that the user can change the setting items without confusion.

<Third Embodiment>

Figure 8:
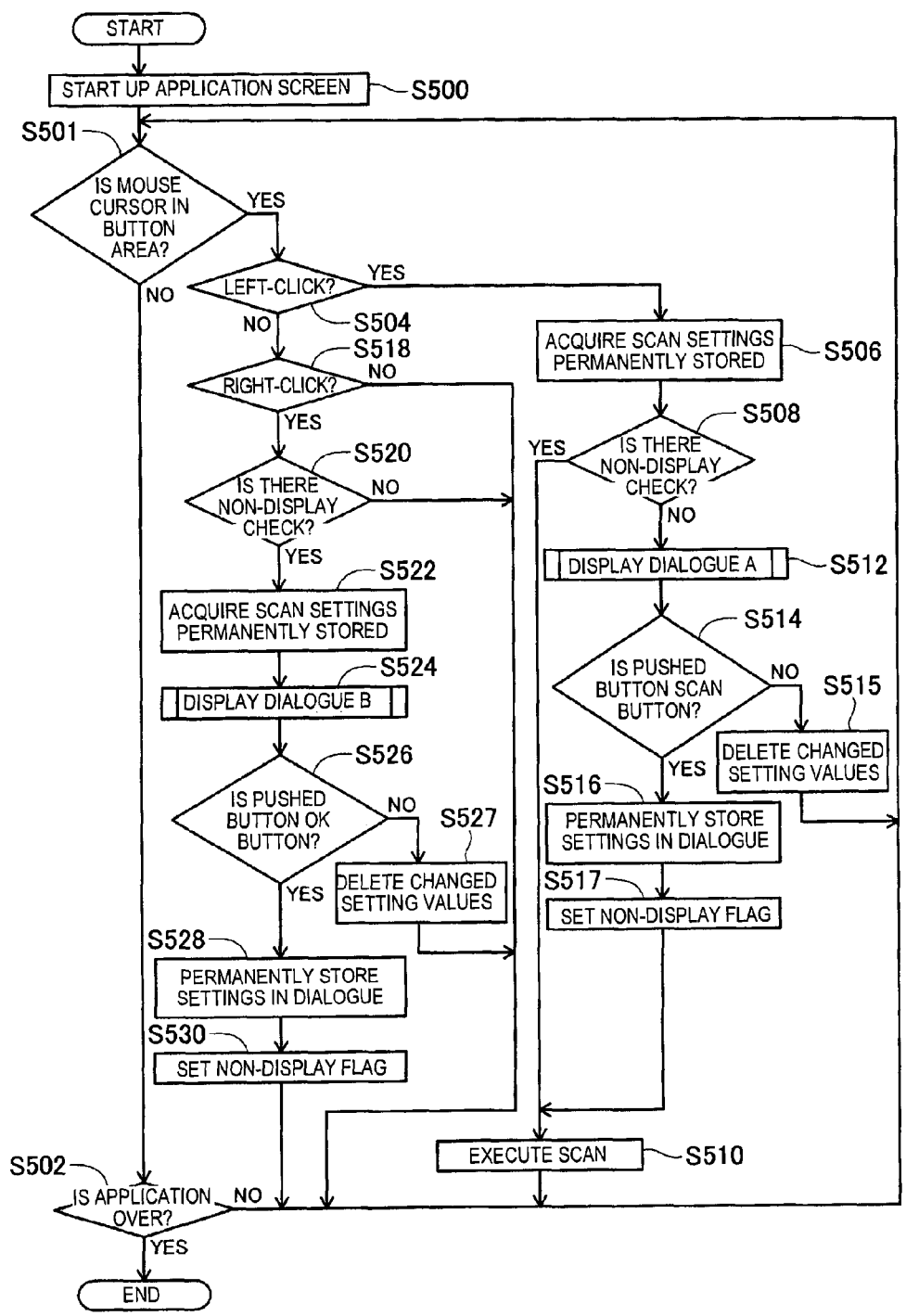
FIG. 8 shows an operation flowchart of the PC 10 according to a third embodiment.

The PC 10 according to the third embodiment transmits an execution command for executing the image reading processing in accordance with the flow shown in FIG. 8 to the scanner 30. Since the processing of the flow shown in FIG. 8 is substantially the same as that of the flow shown in FIG. 5, except for S520, the processing of S520 is described.

In S520, the CPU 11 determines whether the non-display check is marked in the non-display check box TB1. That is, the CPU 11 determines whether the non-display flag is ON. When the non-display check is marked (S520: YES), the CPU 11 executes the processing of S522 and thereafter. On the other hand, when the non-display check is not marked (S520: NO), the CPU 11 returns to S501.

Thereby, only when the setting change dialogue A is prohibited from being displayed, the setting change dialogue B can be displayed. That is, when the setting change dialogue A is not prohibited from being displayed, the setting change dialogue B is not displayed even though the button BT1 to BT4 is right-clicked. The reason is as follows: that is, when the setting change dialogue A is not prohibited from being displayed, it is possible to easily change the setting items, so that the necessity to display the setting change dialogue B is low.

As described above, the setting change dialogue A and the setting change dialogue B are similar and the button operation (left-click) for displaying the setting change dialogue A and the button operation (right-click) for displaying the setting change dialogue B are also similar. Therefore, when displaying the setting change dialogue A or setting change dialogue B, the user may be confused. However, it is possible to reduce the user's confusion by restrictively displaying the setting change dialogue B.

<Fourth Embodiment>

Figure 9:
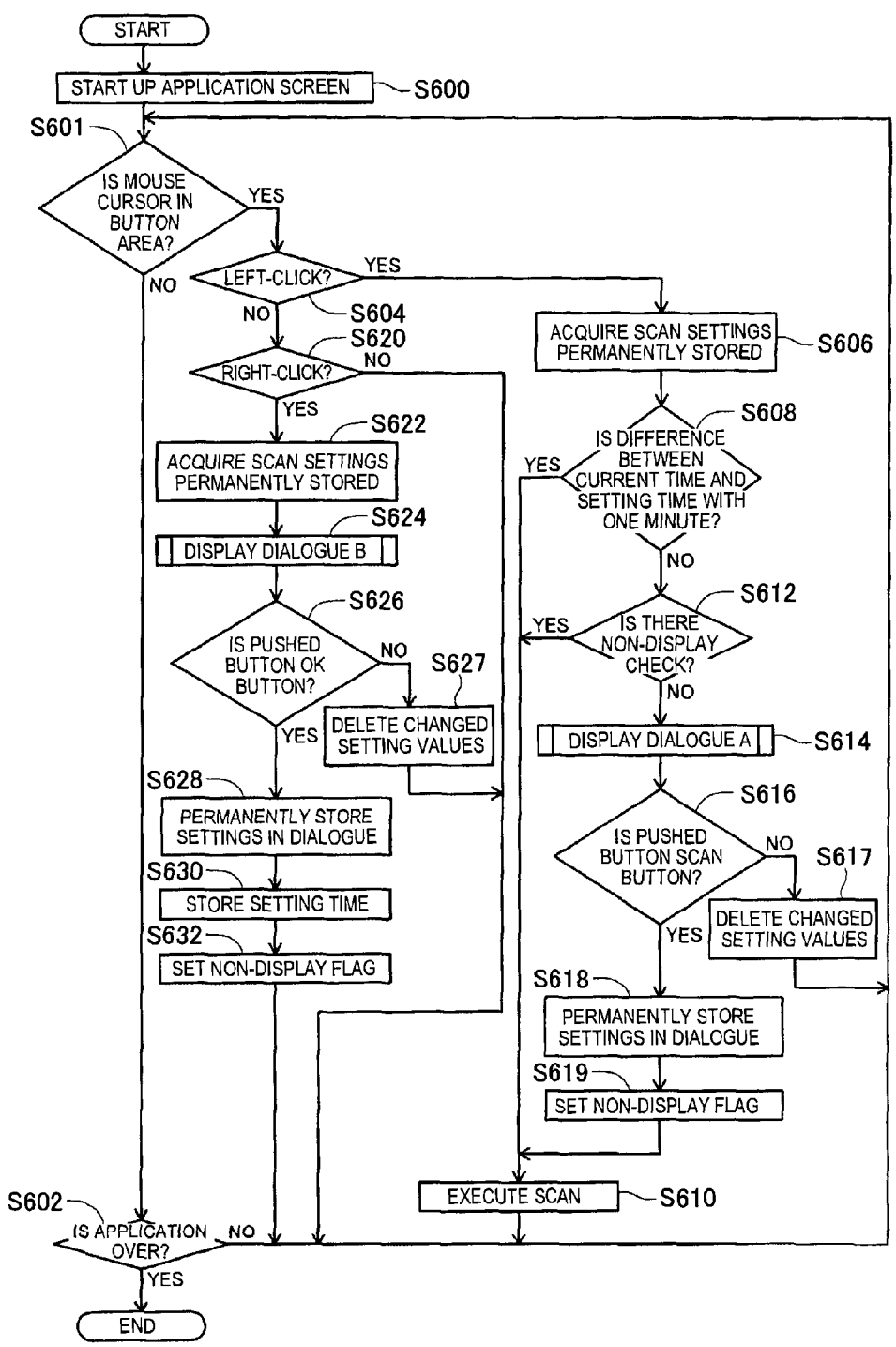
FIG. 9 shows an operation flowchart of the PC 10 according to a fourth embodiment.

The PC 10 according to the fourth embodiment transmits an execution command for executing the image reading processing in accordance with the flow shown in FIG. 9 to the scanner 30. Since the processing of the flow shown in FIG. 9 is substantially the same as that of the flow shown in FIG. 5, except for S608, S610 and S630, the processing of S608, S610 and S630 is described.

When the setting change dialogue B is displayed on the LCD 18, the CPU 11 stores, in S630, time at which the displayed setting change dialogue B is closed, as setting time. Then, when the button BT1 to BT4 is left-clicked after the setting time is stored, the CPU 11 determines whether a difference between the stored setting time and the current time is within one minute (S608). When the difference between the stored setting time and the current time is not within one minute (S608: NO), the CPU 11 executes the processing of S612 and thereafter.

On the other hand, when the difference between the stored setting time and the current time is within one minute (S608: YES), the CPU 11 proceeds to S610. In S610, the CPU 11 transmits an execution command for executing processing based on the setting values of the setting items in the setting change dialogue A to the scanner 30.

As the flow is executed, when the button BT1 to BT4 is left-clicked within a predetermined time period (one minute, in this embodiment) after the setting change dialogue B is displayed on the LCD 18, the execution command of the respective processing is transmitted while the setting change dialogue A is not displayed. The reason is that the necessity to display the setting change dialogue A just after the setting change dialogue B is displayed is low. When the user left-clicks the button BT1 to BT4 just after the setting change dialogue B is displayed, it is determined that the user wants to execute the processing with the content set in the setting change dialogue B. Therefore, it is possible to immediately execute the button operation in accordance with the user's intention.

<Fifth Embodiment>

Figure 10:
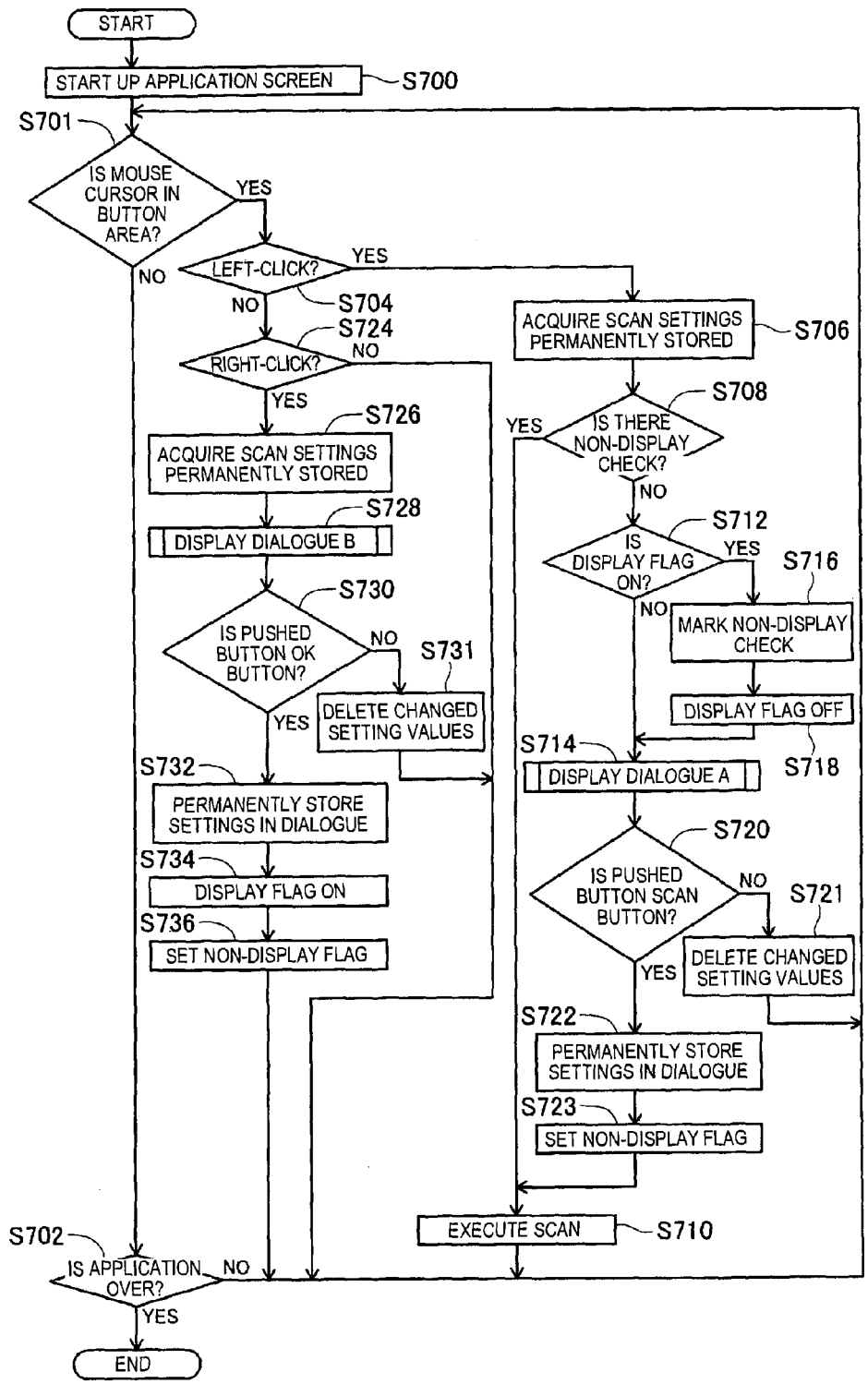
FIG. 10 shows an operation flowchart of the PC 10 according to a fifth embodiment.

The PC 10 according to the fifth embodiment transmits an execution command for executing the image reading processing in accordance with the flow shown in FIG. 10 to the scanner 30. Since the processing of the flow shown in FIG. 10 is substantially the same as that of the flow shown in FIG. 5, except for S712 to S718 and S734, the processing of S712 to S718 and S734 is described.

When the setting change dialogue B is displayed on the LCD 18, the CPU 11 sets a display flag ON (S734). The display flag is to indicate whether the display check is marked in the display check box TB2 and becomes ON when the display check is marked in the display check box TB2. The display flag is stored in the RAM 13.

When the setting change dialogue A is displayed on the LCD 18 and the non-display check is not marked in the non-display check box TB1 (S708: NO), the CPU 11 determines whether the display flag is ON (S712). When the display flag is not ON (S712: NO), the CPU 11 executes the processing of S714 and thereafter.

On the other hand, when the display flag is ON (S712: YES), the CPU 11 proceeds to S716. In S716, the CPU 11 marks the non-display check in the non-display check box TB1. Then, the CPU 11 proceeds to S718. In S718, the CPU 11 sets the display flag OFF. Then, the CPU 11 executes the processing of S714 and thereafter.

As the flow is executed, when the display check is marked in the display check box TB2 of the setting change dialogue B, the setting change dialogue A is displayed only once. Specifically, when the setting change dialogue A is displayed after the display check is marked in the display check box TB2, the non-display check is automatically marked in the non-display check box TB1. Thereby, when the display check is marked in the display check box TB2 and then the button BT1 to BT4 is left-clicked after the second time and thereafter, the image reading processing is executed while the setting change dialogue A is not displayed. Therefore, it is possible to reduce the number of times of the button operation for executing the image reading processing.

<Modified Embodiments>

In the above embodiments, the setting changes in the setting change dialogue A and the setting change dialogue B are stored in the HDD 14, except for the second embodiment. However, the invention is not limited thereto. For example, the setting change in the setting change dialogue A may be stored in the RAM 13 and the setting change in the setting change dialogue B may be stored in the HDD 14. That is, the setting change is temporarily stored at a situation where it is easy to change the setting items and the setting change is permanently stored at a situation where it is difficult to change the setting items. Thereby, it is possible to change the setting items from the initial setting status at a situation where it is easy to change the setting items, so that the user can change the setting items without confusion. It is possible to continuously use the changed setting items at a situation where it is difficult to change the setting items, so that the convenience is improved.

In the above embodiments, a variety of the buttons are operated by left-clicking or right-clicking the mouse. However, the invention is not limited thereto. For example, the buttons may be operated by operating the keyboard. A touch panel, a touch pad and the like may be provided and the buttons may be operated by bringing an input medium close to or contact with the touch panel, the touch pad and the like. In addition, when the mouse is adopted as the input device, the operations of two types may be distinguished by a single click and a double click. Alternatively, when a button is adopted as the input device, the operations of two types may be distinguished by a long pushing and a short pushing.

In the above embodiments, the non-display check box TB1 and the display check box TB2 are displayed at the same position in the setting change dialogue A and the setting change dialogue B. However, the invention is not limited thereto. For example, the non-display check box TB1 and the display check box TB2 may be displayed at different positions insomuch as they are displayed in the same area. The Scan button BT6 and the OK button BT10 are also the same.

In the above embodiments, the Scan button BT6 is displayed to be larger than the OK button BT10, i.e., emphatically displayed in the setting change dialogue A and the setting change dialogue B. However, the invention is not limited thereto. For example, the Scan button BT6 may be emphatically displayed, compared to the OK button BT10, by making brightness, colors, shapes and the like of the Scan button BT6 and the OK button BT10 different.

The execution of the program 14a is not limited to the CPU 11 of the PC 10. For example, a multi-functional peripheral device, a complex machine, a printer, a scanner, a portable phone, a smart phone, a PDA and a computer such as tablet terminal may be also adopted.

The transmission destination of the execution command that is transmitted as the program 14a is executed is not limited to the scanner 30. For example, a multi-functional peripheral device, a complex machine, a printer, a scanner, a portable phone, a smart phone, a PDA, a tablet terminal, a digital camera and the like may be also possible.

The specific numbers, numerical values and the like enumerated in the above embodiments are just exemplary and may be changed into a variety of numbers, numerical values and the like. For example, the number of the buttons to which the various image reading processing to be displayed on the scanner control window is allotted, the time that is the determination basis in S608 of FIG. 9 and the like may be set with arbitrary numbers, numerical values and the like.

In the PC 10 of the above embodiments, the CPU 11 that executes the processing, based on the program 14a, performs the variety of the processing. However, the invention is not limited thereto. For example, the CPU 11 that executes the processing, based on the program 14a, may instruct another system and hardware configuration to execute the variety of the processing.

The technical elements illustrated in the specification or drawings exhibit the technical availability individually or by a variety of combinations thereof and are not limited to the combinations defined in the claims at the time of filing the application. The technology exemplified in the specification or drawings achieves a plurality of purposes at the same time and the achievement of any one purpose has the technical availability.

The PC 10 is an example of the image processing apparatus. The CPU 11 is an example of the computer. The RAM 13 is an example of the first storage unit (storage unit). The HDD 14 is an example of the second storage unit (storage unit). The non-display flag 13a is an example of the non-display information. The non-display check is an example of the non-display instruction. The display check is an example of the display instruction. The device control program 14a is an example of the image processing program. The LCD 18 is an example of the display unit. The scanner 30 is an example of the image forming apparatus.

The setting change dialogue A is an example of the first setting screen. The setting change dialogue B is an example of the second setting screen. The buttons BT1 to BT4 are an example of the functional image. The selection boxes SB1 and SB2 are an example of the processing information. The non-display check box TB1 is an example of the non-display instruction reception image. The display check box TB2 is an example of the display instruction reception image. The Scan button BT6 is an example of the execution instruction image. The OK button BT10 is an example of the update instruction image. The information window is an example of the operation information. The first operation is an example of the left-click. The second operation is an example of the right-click.

The CPU 11 that executes S100, S400, S500, S600 and S700 is an example of the function display control means and the function display control step. The CPU 11 that executes S118, S132, S418, S204, S432, S516, S528, S618, S628, S722 and S734 is an example of the storage control means and the storage step. The CPU 11 that executes S114, S412, S512, S614 and S714 is an example of the first display control means and the first display control step. The CPU 11 that executes S112, S410, S510, S610 and S710 is an example of the transmission means and the transmission step. The CPU 11 that executes S128, S428, S524, S624 and S728 is an example of the second display control means and the second display control step. The CPU 11 that executes S210 and S310 is an example of the non-display storage control means and the non-display storage step. The CPU 11 that executes S212 and S312 is an example of the operation display control means and the operation display control step. The CPU 11 that executes S416 is an example of the non-display instruction determination means. The CPU 11 that executes S608 is an example of the input determination means.

In the meantime, the program 14a may be configured by one program module or a plurality of program modules. Each example may be another replaceable configuration and is within the category of the invention. The program may be a computer (CPU 11) that executes the processing based on the image processing program (device control program 14a), a computer that executes the processing based on a program such as operating system, the other applications, programs and the like other than the image processing program, a hardware configuration (LCD 18 and the like) that operates in response to an instruction of the computer or a configuration in which the computer and the hardware configuration interlock. The program may be a computer that executes the processing by interlocking the processing based on a plurality of programs or a hardware configuration that operates in response to an instruction of the computer executing the processing by interlocking the processing based on a plurality of programs.

What is claimed is:

1. A non-transitory computer readable recording medium storing an image processing program that is executed by a computer of an image processing apparatus, the image processing program, when executed by the computer, causing the computer to function as:

a function display controller configured to display, on a display unit, a functional image for instructing to execute processing using a function of an image forming apparatus;

a storage controller configured to store, in a storage unit, processing information indicating a setting value for executing the function of the image forming apparatus in association with the functional image;

a first display controller configured to display, on the display unit, a first setting screen which variably displays the setting value stored in association with the functional image, the first setting screen including an execution instruction image for executing the function based on the setting value displayed on the screen, if an input made by a first operation for the functional image is received;

a transmission controller configured to transmit, to the image forming apparatus, a function execution command for executing the function based on the setting value displayed on the first setting screen if an input for the execution instruction image is received;

a second display controller configured to display, on the display unit, a second setting screen which variably displays the setting value stored in association with the functional image, if an input made by a second operation for the functional image is received;

a non-display storage controller configured to store, in the storage unit, non-display information indicating that the non-display instruction is received if a non-display instruction which does not display the first setting screen in response to the input made by the first operation at a state where the first setting screen is displayed on the display unit is received; and an operation display controller configured to display, on the display unit, operation information which indicates that the setting value can be changed by the input made by the second operation for the functional image if the non-display instruction is received, wherein the storage controller updates the setting value configuring the processing information into the setting value changed on the second setting screen if the setting value is changed on the second setting screen, wherein in a case that the input made by the first operation for the functional image is received, the first display controller does not display the first setting screen on the display unit if the non-display information is stored in the storage unit, wherein the transmission unit transmits, to the image forming apparatus, the function execution command which executes the function based on the processing information stored in the storage unit in association with the functional image if the input made by the first operation for the functional image is received at a state where the non-display information is stored in the storage unit, and wherein in a case that the non-display instruction is not stored in the storage unit and the input made by the first operation for the functional image is received, the first display controller displays the first setting screen on the display unit and the transmission unit transmits, to the image forming apparatus, the function execution command if the input for the execution instruction image is received.

2. The non-transitory computer readable recording medium according to claim 1, wherein the non-display storage controller deletes the non-display information stored in the storage unit if a display instruction displaying the first setting screen is received at a state where the second setting screen is displayed on the display unit.

3. The non-transitory computer readable recording medium according to claim 2,
wherein
the first setting screen includes a non-display instruction reception image for receiving the non-display instruction,
the second setting screen includes a display instruction reception image for receiving the display instruction, and
a display position of the non-display instruction reception image in the first setting screen and a display position of the display instruction reception image in the second setting screen are within a same area.

4. The non-transitory computer readable recording medium according to claim 1, wherein
the second setting screen includes an update instruction image for updating the setting value configuring the processing information into a setting value to be displayed on the screen by the storage controller, and
a display position of the execution instruction image in the first setting screen and a display position of the update instruction image in the second setting screen are within a same area.

5. The non-transitory computer readable recording medium according to claim 4, wherein the execution instruction image in the first setting screen is more emphatically displayed than the update instruction image in the second setting screen.

6. The non-transitory computer readable recording medium according to claim 1, wherein
the function display controller displays a plurality of the functional images on the display unit,
the storage controller stores, in the storage unit, the processing information in association with the function image, for each of the functional images,
in a case that the non-display information which has been stored at the time that the first setting screen variably displaying the setting value stored in association with a first functional image is displayed is stored in the storage unit, the first display controller does not display the first setting screen on the display unit if the input made by the first operation for a second functional image different from the first functional image is received, and
the transmission unit transmits, to the image forming apparatus, the function execution command based on the processing information which is stored in the storage unit in association with the second functional image if the input made by the first operation for the second functional image is received at a state where the non-display information is stored in the storage unit.

7. The non-transitory computer readable recording medium according to claim 1, wherein
the storage unit includes a first volatile storage unit and a second non-volatile storage unit,
the storage controller stores the changed setting value in the first volatile storage unit if the setting value is changed on the first setting screen, and
the storage controller stores the changed setting value in the second non-volatile storage unit if the setting value is changed on the second setting screen.

8. The non-transitory computer readable recording medium according to claim 1, wherein
the storage unit includes a first volatile storage unit and a second non-volatile storage unit,
the image processing program, when executed by the computer, causes the computer to further function as a non-display instruction determination unit configured to, if the input for the execution instruction image is received, determine whether the non-display instruction is received at a state where the first setting screen including the execution instruction image is displayed, and
in a case that the non-display instruction determination unit determines that the non-display instruction is received, the storage controller stores the changed setting value in the second non-volatile storage unit if the setting value is changed on the first setting screen, and
in a case that the non-display instruction determination unit determines that the non-display instruction is not received, the storage controller stores the changed setting value in the first volatile storage unit if the setting value is changed on the first setting screen.

9. The non-transitory computer readable recording medium according to claim 1, wherein in a case that the input made by the second operation for the functional image is received, the second display controller displays the second setting screen on the display unit if the non-display information is stored in the storage unit, and the second display controller does not display the second setting screen on the display unit if the non-display information is not stored in the storage unit.

10. The non-transitory computer readable recording medium according to claim 1, the image processing program, when executed by the computer, causes the computer to further function as an input determination unit configured to determine whether a predetermined time period elapses after a change of the setting value on the second setting screen is received until the input made by the first operation for the functional image is received if the input made by the first operation for the functional image is received and the non-display information is not stored in the storage unit, the first display controller displays the first setting screen if the input determination unit determines that the input made by the first operation is received after the predetermined time period elapses, the first display controller does not display the first setting screen on the display unit if the input determination unit determines that the input made by the first operation is received within the predetermined time period, the transmission unit transmits the function execution command based on the setting value displayed on the first setting screen to the image forming apparatus if the input determination unit determines that the input made by the first operation is received after the predetermined time period elapses, and the transmission unit transmits the function execution command based on the processing information stored in the storage unit in association with the function image to the image forming apparatus if the input determination unit determines that the input made by the first operation is received within the predetermined time period.

11. An image processing method capable of performing communication with an image forming apparatus capable of executing predetermined processing for image data, the method comprising:

displaying a functional image for executing processing using a function of the image forming apparatus on a display unit;

storing, in a storage unit, processing information indicating a setting value for executing a function of the image forming apparatus in association with the functional image;

displaying, on the display unit, a first setting screen which variably displays the setting value stored in association with the functional image and includes an execution instruction image for executing the function based on the setting value displayed on the screen if an input made by a first operation for the functional image is received;

transmitting, to the image forming apparatus, a function execution command for executing the function based on the setting value displayed on the first setting screen if an input for the execution instruction image is received;

displaying, on the display unit, a second setting screen which variably displays the setting value stored in association with the functional image if an input made by a second operation for the functional image is received;

storing non-display information indicating that the non-display instruction is received in the storage unit if a non-display instruction which does not display the first setting screen in response to the input made by the first operation at a state where the first setting screen is displayed on the display unit is received, and displaying, on the display unit, operation information which indicates that the setting value can be changed by the input made by the second operation for the functional image if the non-display instruction is received, wherein if the setting value is changed on the second setting screen, the setting value configuring the processing information is updated into a changed setting value, wherein in a case that the input made by the first operation for the functional image is received, the first setting screen is not displayed on the display unit if the non-display information is stored in the storage unit, wherein if the input made by the first operation for the functional image is received at a state where the non-display information is stored in the storage unit, the function execution command, which executes the function based on the processing information stored in the storage unit in association with the functional image, is transmitted to the image forming apparatus, and wherein in a case that the non-display instruction is not stored in the storage unit and the input made by the first operation for the functional image is received, the first setting screen is displayed on the display unit and the function execution command is transmitted to the image forming apparatus if the input for the execution instruction is received.

12. An information processing apparatus comprising:

a processor; and memory storing computer readable instructions that, when executed by the processor, causing the apparatus to function as:

a function display controller configured to display, on a display unit, a functional image for instructing to execute processing using a function of an image forming apparatus;

a storage controller configured to store, in a storage unit, processing information indicating a setting value for executing the function of the image forming apparatus in association with the functional image;

a first display controller configured to display, on the display unit, a first setting screen which variably displays the setting value stored in association with the functional image, the first setting screen including an execution instruction image for executing the function based on the setting value displayed on the screen, if an input made by a first operation for the functional image is received;

a transmission controller configured to transmit, to the image forming apparatus, a function execution command for executing the function based on the setting value displayed on the first setting screen if an input for the execution instruction image is received;

a second display controller configured to display, on the display unit, a second setting screen which variably displays the setting value stored in association with the functional image, if an input made by a second operation for the functional image is received;

a non-display storage controller configured to store, in the storage unit, non-display information indicating that the non-display instruction is received if a non-display instruction which does not display the first setting screen in response to the input made by the first operation at a state where the first setting screen is displayed on the display unit is received; and an operation display controller configured to display, on the display unit, operation information which indicates that the setting value can be changed by the input made by the second operation for the functional image if the non-display instruction is received, wherein the storage controller updates the setting value configuring the processing information into the setting value changed on the second setting screen if the setting value is changed on the second setting screen, wherein in a case that the input made by the first operation for the functional image is received, the first display controller does not display the first setting screen on the display unit if the non-display information is stored in the storage unit, wherein the transmission unit transmits, to the image forming apparatus, the function execution command which executes the function based on the processing information stored in the storage unit in association with the functional image if the input made by the first operation for the functional image is received at a state where the non-display information is stored in the storage unit, and wherein in a case that the non-display instruction is not stored in the storage unit and the input made by the first operation for the functional image is received, the first display controller displays the first setting screen on the display unit and the transmission unit transmits, to the image forming apparatus, the function execution command if the input for the execution instruction image is received.

13. A non-transitory computer readable recording medium storing an image processing program that is executed by a computer of an image processing apparatus, the image processing program, when executed by the computer, causing the computer to function as:

a function display controller configured to display, on a display unit, a functional image for instructing to execute processing using a function of an image forming apparatus;

a storage controller configured to display, on the display unit, a first setting screen which variably displays the setting value stored in association with the functional image, the first setting screen including an execution instruction image for executing the function based on the setting value displayed on the screen, if an input made by a first operation for the functional image is received;

a transmission controller configured to transmit, to the image forming apparatus, a function execution command for executing the function based on the setting value displayed on the first setting screen if an input for the execution instruction image is received;

a second display controller configured to display, on the display unit, a second setting screen which variably displays the setting value stored in association with the functional image, if an input made by a second operation for the functional image is received;

a non-display storage controller configured to store, in the storage unit, non-display information indicating that the non-display instruction is received if a non-display instruction which does not display the first setting screen in response to the input made by the first operative at a state where the first setting screen is displayed on the display unit is received; and an operation display controller configured to display, on the display unit, operation information which indicates that the setting value can be changed by the input made by the second operation for the functional image if the non-displayed instruction is received, wherein the storage controller updates the setting value configuring the processing information into the setting value changed on the second setting screen if the setting value is changed on the second setting screen, wherein in a case that the input made by the first operation for the functional image is received, the first display controller does not display the first setting screen on the display unit if the non-display information is stored in the storage unit, wherein the transmission unit transmits, to the image forming apparatus, the function execution command which executes the function based on the processing information stored in the storage unit in association with the functional image if the input made by the first operation for the functional image is received at a state where the non-display information is stored in the storage unit, and wherein in a case that the non-display information which has been stored at the time that the first setting screen variably displaying the setting value stored in association with a first functional image is displayed is stored in the storage unit, the first display controller does not display the first setting screen on the display unit if the input made by the first operation is received.

* * * * *